Patented Feb. 5, 1924.

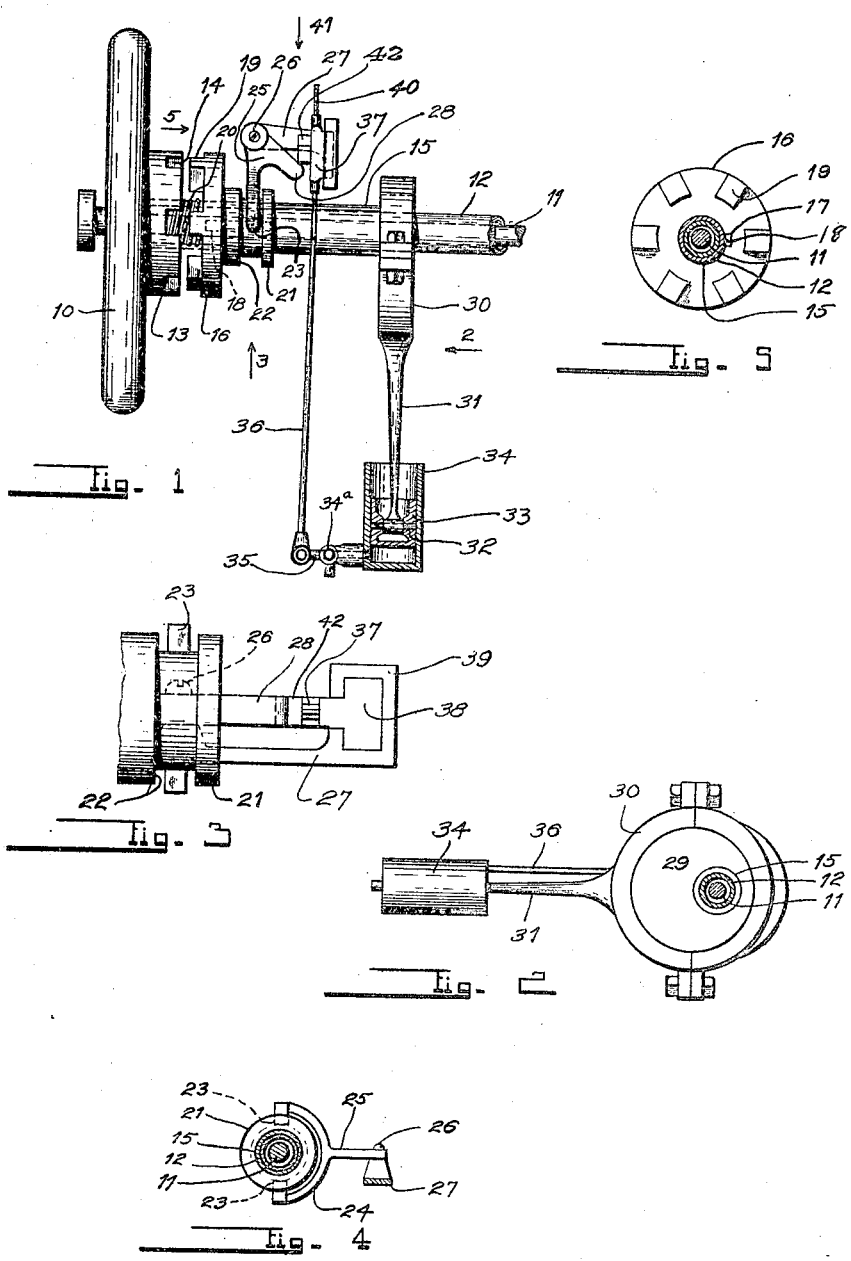

1,482,729

UNITED STATES PATENT OFFICE.

HENRY C. BUCHWALD, OF BALTIMORE, MARYLAND.

BRAKING MECHANISM FOR WHEELED VEHICLES.

Application filed December 21, 1920. Serial No. 432,180.

*To all whom it may concern:*

Be it known that I, HENRY C. BUCHWALD, a citizen of the United States, residing at Baltimore, in the State of Maryland, have invented certain new and useful Improvements in Braking Mechanism for Wheeled Vehicles; and I do hereby declare the following to be a full, clear, and exact description of the invention, such as will enable others skilled in the art to which it appertains to make and use the same.

My invention relates to braking mechanisms for wheeled vehicles.

Among the objects of my invention are:

To provide a braking mechanism for wheeled vehicles which shall depend for its braking effect upon the resistance of compressed air and thus avoid the usual friction disks or rings and the cooperating shoes and the wear incident to the abrading interaction of these parts.

To provide a braking mechanism so constructed and arranged as to compress air during one portion of its motion and yet be free from any accelerative effect due to the expansion of the air during another portion of its motion.

To provide a braking mechanism which shall be simple, cheap, effective and capable of ready application to existing wheeled vehicles as well as to those in process of construction.

Heretofore it has been customary to dissipate the energy of a wheeled vehicle by the production of heat generated by the interaction of two rubbing surfaces, but I have found that it is preferable to dissipate said energy by the production of heat generated by the compression of an expansible fluid such as air, for by this mode of operation the wear upon the mechanical parts is eliminated.

In carrying out my invention I make use of the instrumentalities illustrated in the accompanying drawing, in which:

Figure 1 is a plan view showing the attachment of my improved mechanism to one wheel of a vehicle.

Fig. 2 is a side elevation in part section showing the eccentric and sliding members looking in the direction of the arrow 2 in Fig. 1.

Fig. 3 is an enlarged detail view of the collar 21 and guide 39 looking in the direction of the arrow 3 in Fig. 1.

Fig. 4 is a detail view showing the collar 21 and bell crank lever 25 with support therefor, the parts being viewed in the direction of the arrow 2 in Fig. 1.

Fig. 5 is a view of the slidable clutch member looking in the direction of the arrow 5 in Fig. 1.

In the drawings:

10 represents the wheel of a vehicle mounted to revolve either upon or with the axle 11. The axle 11 is supported in any approved manner in the tube 12.

A main clutch member 13 is fixed in any approved manner to the wheel 10 and is provided with a plurality of clutch slots 14. The tube 15 is revolubly mounted upon the tube 12 and is prevented from moving endwise thereon in any approved manner, not shown.

The sliding clutch member 16 is slidably mounted upon the tube 15 and is provided with a key slot 17 which works freely on the key 18 secured on the outer surface of the tube 15. The member 16 is provided with a plurality of teeth such as 19 adapted to mesh with the slots 14 of the main clutch member 13, and a spring 20 serves to restore the member 16 to the position shown in Fig. 1 after each displacement therefrom, as hereinafter explained.

The collar 21 is formed integrally with the member 16 and said collar is provided with the groove 22 into which extend the pins 23—23 formed upon the fork 24 of the bell crank lever 25. The bell crank lever 25 is pivoted upon the screw 26 and the latter is secured in the bracket 27. The bell crank lever 25 is also provided with an arm 28 for a purpose hereinafter explained. On the inner end of the tube 15 there is secured the eccentric 29 which revolves within the eccentric strap 30, the latter being provided with the connecting rod 31 having its inner end pivotally mounted upon the wrist pin 32, the latter being secured in the piston 33. The piston 33 works freely within the cylinder 34 and the latter is secured to the frame of the vehicle in any approved manner.

A valve 34ª operated by the lever 35 is arranged to open and close the communication between the atmosphere and the space between the inner end of the piston 32 and the head of the cylinder 34. The pull rod 36 is pivotally connected at one end to the lever 35 and at the other end is connected to the slide 37. The slide 37 has an enlarged portion 38 which is slidably mounted in a guide 39 formed upon the bracket 27; the other end of the slide 37 is connected by the pull rod 40 with a pedal and spring, or other means, so that said pull rod may be moved in the direction of the arrow 41 in Fig. 1 or the reverse, as desired. The slide 37 carries a projection 42 which contracts with the arm 28 of the bell crank lever 25 as hereinafter explained.

The operation of my improved braking mechanism is as follows:—

The parts being in the positions shown in Fig. 1 the wheel 10 revolves freely and the tube 15 remains stationary. Should it now be desired to retard the motion of the vehicle, the chauffeur operates appropriate mechanism to move the pull rod 40 in the direction of the arrow 41. During the first portion of this movement the projection 42 moves the arm 28 of the bell crank lever 25 so as to throw the pins 23 towards the left (see Fig. 1), thus moving the teeth 19 of the member 16 into engagement with the slots 14 of the member 13, thus causing the tube 15 and the eccentric 29 to revolve. When the eccentric 29 revolves the piston 33 reciprocates within the cylinder 23 but no braking action results because the valve $34^a$, although it has moved slightly, has not been moved sufficiently to reduce the size of the passageway leading from the atmosphere into the interior of the cylinder 34. Further movement of the rod 40 in the direction of the arrow 41 then commences to reduce the area of this passageway and, consequently, as the piston 33 moves toward the closed end of the cylinder 34 the amount of this resistance will be increased by a still further movement of the rod 40 in the direction of the arrow 41. Thus, the braking effect will be increased.

When the rod 40 has been moved so far in the direction just explained as to entirely close the passage between the atmosphere and the interior of the cylinder 34 then the resistance to the motion of the piston 33 will be so great as to chock the wheel 10.

It is to be noted that by driving the piston 33 from the tube 15 through the intermediary of an eccentric and strap 30, I am unable to insure that the retarding effect of the air against the piston 33 will oppose the revolution of the wheel 10, but that when said eccentric moves in the direction to move the piston 33 toward the open end of the cylinder 34, then the expansive effect of the air will be unable to accelerate the motion of the vehicle, owing to the fact that the effort of the wrist pin 32 upon the connecting rod 31 is applied in such a direction to the effective portion of the surface of the eccentric 29 that the angle between said portion and said direction is always less than the angle of repose.

While I have shown my improvement as applied to but one wheel of a vehicle, it is evident that it may be applied to as many as is found desirable. It is also evident that many changes may be made in the construction of my invention without departing from the spirit thereof.

I claim:

1. A combination with a wheel, of a clutch member secured thereto, a cooperating clutch member, means for engaging said members, a cylinder, an imperforate piston in said cylinder, an eccentric driven by said second named member for reciprocating said piston, a passage from said cylinder to the atmosphere and a valve in said passage.

2. The combination with a tube, an axle revolving therein, a wheel on said axle and a clutch member on said wheel, of a tube revolubly mounted upon said first named tube, a co-operating clutch member on said last named tube, means for engaging said members, a cylinder, a piston in said cylinder, means operated by said last named tube for reciprocating said piston, a passage from said cylinder to the atmosphere and a valve in said passage.

3. The combination with a wheel, of a clutch member secured thereto, a co-operating clutch member, means for engaging said members, a cylinder, a piston in said cylinder reciprocated by said last named member, a passage from said cylinder to the atmosphere, said piston drawing in air from and returning it to the atmosphere through said passage and a valve in said passage.

4. The combination with a wheel, of a clutch member secured thereto, a cooperating clutch member, a cylinder, an imperforate piston in said cylinder driven by said cooperating clutch member, a valve for controlling the influx and efflux of air to said cylinder and means for first engaging said members and afterwards moving said valve to vary the influx and efflux of said air.

5. The combination with a wheel, of a clutch member secured thereto, a cooperating clutch member, a cylinder, an imperforate piston in said cylinder driven by said cooperating clutch member, a valve for controlling the influx and efflux of air to said cylinder and means for first engaging said members and afterwards moving said valve to vary the influx and efflux of said air, said last-named means also acting to hold said members engaged during the movement of said valve.

In testimony whereof, I affix my signature.

HENRY C. BUCHWALD.